United States Patent [19]

Tabatabai et al.

[11] Patent Number: 5,686,964
[45] Date of Patent: Nov. 11, 1997

[54] BIT RATE CONTROL MECHANISM FOR DIGITAL IMAGE AND VIDEO DATA COMPRESSION

[76] Inventors: Ali Tabatabai, 10495 S.W. 155 Ave., Beaverton, Oreg. 97007; T. Naveen, 1765 N.W. 173rd Ave., #705, Beaverton, Oreg. 97006; Robert O. Eifrig, 3820 S.W. 117th St., Apt. 75, Beaverton, Oreg. 97005

[21] Appl. No.: 566,100

[22] Filed: Dec. 4, 1995

[51] Int. Cl.[6] ............................................. H04N 7/12
[52] U.S. Cl. .................. 348/420; 348/394; 348/405; 348/415; 348/419
[58] Field of Search .................... 348/394, 405, 348/415, 419, 420; 382/239, 243

[56] References Cited

U.S. PATENT DOCUMENTS

| | | | |
|---|---|---|---|
| 5,038,209 | 8/1991 | Hang | 348/419 |
| 5,253,078 | 10/1993 | Balkanski et al. | 358/426 |
| 5,396,567 | 3/1995 | Jass | 348/394 |
| 5,434,623 | 7/1995 | Coleman et al. | 348/405 |
| 5,440,346 | 8/1995 | Alattar et al. | 348/420 |
| 5,448,297 | 9/1995 | Alattar et al. | 348/415 |
| 5,459,518 | 10/1995 | Wickstrom et al. | 348/420 |
| 5,552,832 | 9/1996 | Astle | 348/420 |
| 5,557,330 | 9/1996 | Astle | 348/394 |

OTHER PUBLICATIONS

"Scene Adaptive Coder", IEEE Transactions on Communications, vol. Com.–32, No. 3, Mar. 1984 Wen–Hsiung Chen and William K. Pratt.

*Primary Examiner*—Howard W. Britton
*Assistant Examiner*—Frank Snow
*Attorney, Agent, or Firm*—Francis I. Gray

[57] ABSTRACT

A bit rate control mechanism for a digital image or video compression system estimates a complexity parameter for a current picture, or block of samples, of a video signal as a function of parameters for a prior picture of the video signal, which parameters include a bit rate. From the complexity parameter a quality factor for the current picture is determined and applied to a quantizer to compress the current picture. A complexity pre-processor may also be used to detect scene changes in the video signal prior to estimating the complexity parameter. If there is a scene change detected, then the rate control mechanism is reset prior to estimating the complexity parameter for the first picture in the new scene.

8 Claims, 4 Drawing Sheets

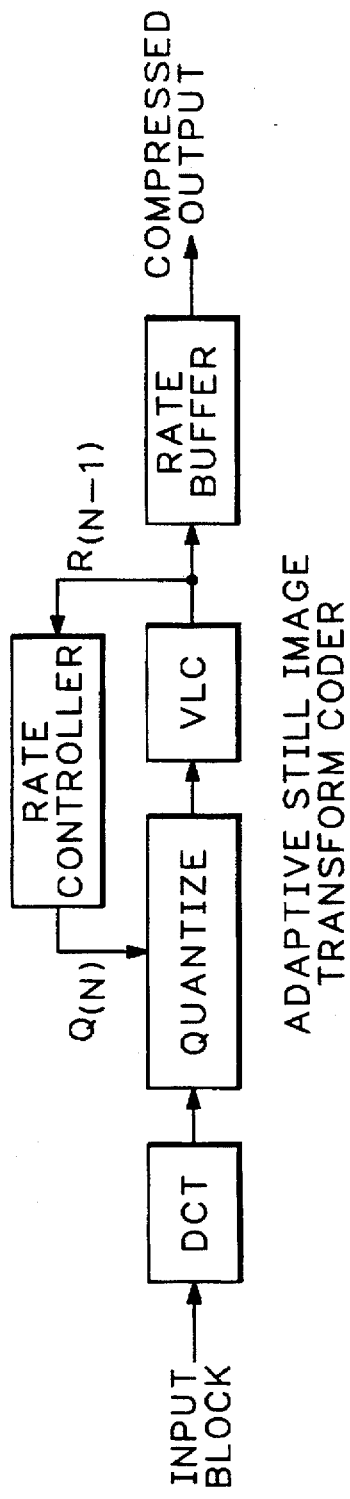
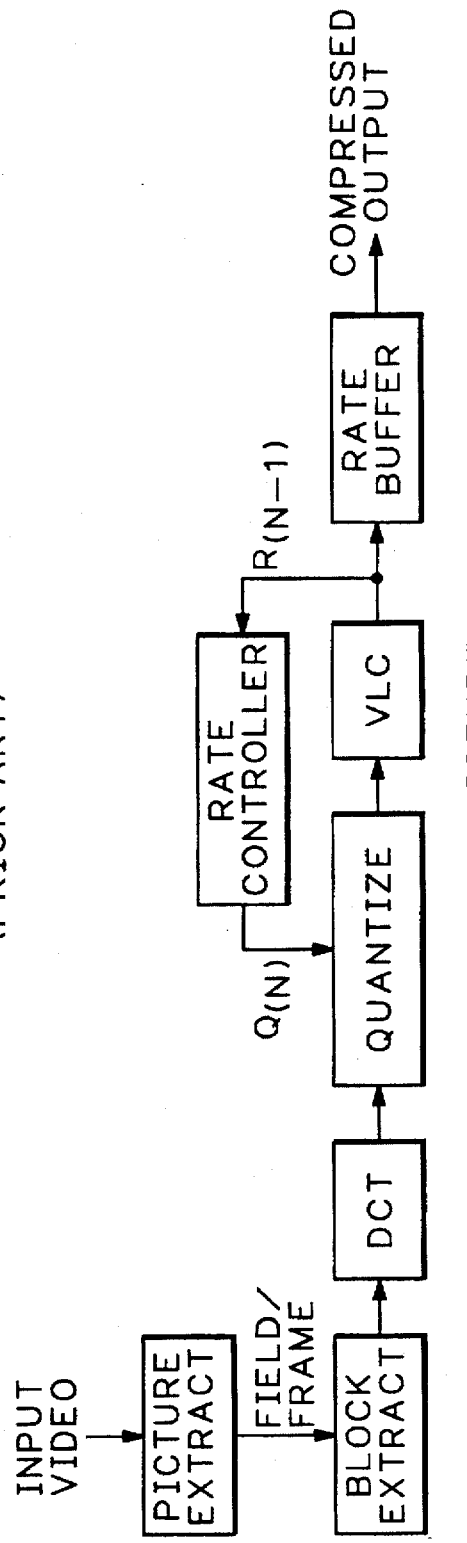

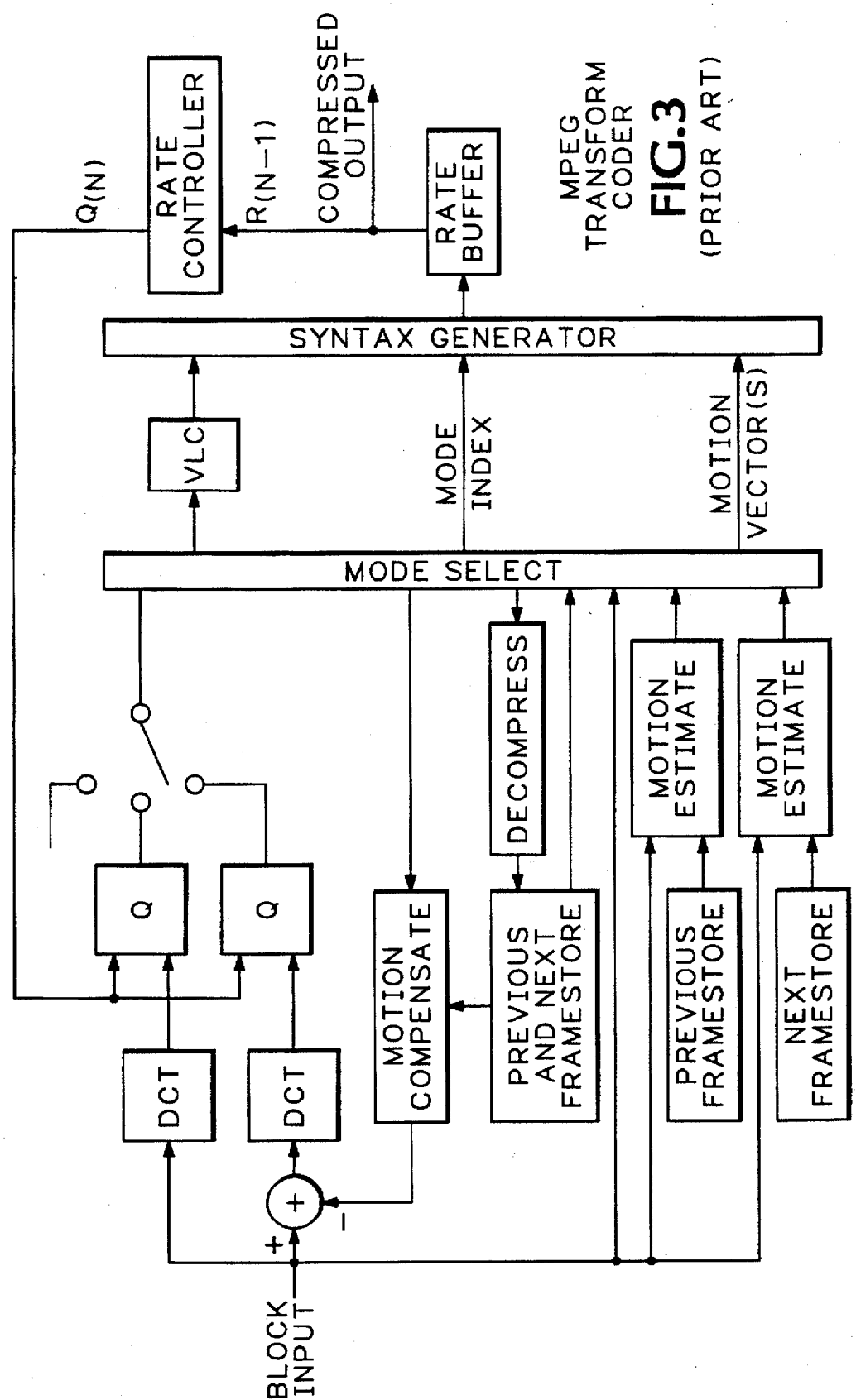
FIG.3 (PRIOR ART) MPEG TRANSFORM CODER

OVERLAPPING WINDOWS

NON-OVERLAPPING WINDOWS

COMPLEXITY PRE-PROCESSOR

BIT RATE CONTROL MECHANISM FOR DIGITAL IMAGE AND VIDEO DATA COMPRESSION

BACKGROUND OF THE INVENTION

The present invention relates to data compression, and more particularly to a bit rate control mechanism for digital image and video data compression that estimates the number of bits required to represent a digital image or a video at a particular quality in compressed form or alternatively estimates the quality achievable for a digital image or a video when compressed to a given number of bits, which estimates are used to control the number of bits generated by a video compression system.

Visual information may be represented by digital pictures using a finite amount of digital data for still images, and by a finite data rate for time-varying images. Such data in its uncompressed form contains a considerable amount of superfluous information. Image compression techniques attempt to reduce the superfluous information by minimizing the statistical and subjective redundancies present in digital pictures. Pulse code modulation, predictive coding, transform coding, interpolative/extrapolative coding and motion compensation are some of the tools used in image compression techniques.

A digital video/image compression technique may be either lossy or lossless. The lossy compression techniques introduce an irreversible amount of distortion into the picture data. In these techniques a trade-off is made between the amount of distortion added to the original picture input and the number of bits the compressed picture occupies. A rate controller in a video/image compression system controls the number of bits generated by altering the amount of distortion added to the original input by the compression system. In other words a rate controller in a video/image encoder controls the number of bits needed to represent the compressed image by changing the quality of the decompressed image.

Transform coding techniques take a block of samples as the input, transform this block into a number of transform coefficients, quantize the transform coefficients, and variable or fixed length encode the quantized transform coefficients. The input to the transform coding system may be either the original picture elements (pixels), such as in JPEG and intra-MPEG, or the temporal differential pixels, such as in inter-MPEG. An adaptive still image coding technique using a transform coder with a rate controller is shown in FIG. 1. An input image block is transformed by a discrete cosine transform (DCT) function, quantized and variable length coded (VLC). The rate controller observes $R(n-1)$, the number of bits generated by the previous block, and selects a quantizer scale factor $Q(n)$ for the current block. A still image coding scheme, such as JPEG, may be used on a motion picture, as shown in the simplified block diagram of FIG. 2. In these schemes the rate controller observes $R(n-1)$, the number of bits generated by the previous frame (field), and selects a quantizer scale factor $Q(n)$ for the current frame (field). A simplified block diagram of an MPEG encoder is shown in FIG. 3, where $R(n-1)$ is the typical number of bits generated in the previous macroblock. For JPEG $Q(n)$ is referred to as qfactor or quality factor, and for MPEG it is referred to as mquant.

In all of the schemes shown in FIGS. 1–3 $Q(n)$ is used to scale the step sizes of the quantizers of transform coefficients (quantizer matrices). Increasing $Q(n)$ reduces $R(n)$ and vice versa. $Q(n)$ is selected so that $R(n)$, the number of bits generated with this quantizer scale factor $Q(n)$, is close to the targeted rate for the block, frame or field. $Q(n)$ also is an indication of the quality of the decoded block, frame or field. To perform efficiently, a rate control algorithm requires a good estimate of the rate-quality relationships for the input data, i.e., $R(n)$ vs. $Q(n)$. A good rate controller would come up with a $Q(n)$ that results in a targeted $R(n)$. The targeted $R(n)$ for a block, frame or field could vary with n. For example it might take into account the visual characteristic of the block in question, whether the coding is variable bit rate (VBR) or constant bit rate (CBR). A good rate controller tries to keep the $Q(n)$ smooth over n so that the resulting quality of the decoded picture is smooth as well.

Given actual $R(n-1)$, the actual bits generated for the preceding block number $n-1$, Chen et al, as described in "Scene Adaptive Coder" from *IEEE Trans. Communications* Mar. 1984, compute $Q(n)$ in the following manner. A buffer status $B(n-1)$ after coding block $n-1$ is recursively computed using $$B(n-1)=B(n-2)+R(n-1)-R$$

where R is the average coding rate in bits per block. From the buffer status $B(n-1)$ the quality factor $Q(n)$ is computed through $$Q(n)=(1-\gamma)*\phi(B(n-1)/B)+\gamma*Q(n-1)$$

where $\phi\{\}$ is an empirically determined normalization factor versus buffer status curve and B is the rate buffer size in bits. This produces a smoothly varying $Q(n)$ depending on $\gamma$. $\gamma$ is taken to be less than unity.

Alternatively the Test Model Editing Committee, International Organisation for Standardisation, *Test Model 3(Draft)*, Dec. 1992 computes $Q(n)$ in a similar way as follows. First the virtual buffer status $B(n-1)$ is computed as above. Then $Q(n)$ is computed through the linear relation $$Q(n)=K_R*B(n-1)$$

where $K_R$ is a constant that depends on the targeted average bit rate. This $Q(n)$ may be further scaled based on the visual complexity of the block being coded.

Using these techniques $Q(n)$ could change rapidly, and there is no estimate of the quality achievable for a particular block, frame or field with a given number of bits. What is desired is a rate control mechanism that estimates the quality achievable for a digital image or video when compressed to a given number of bits or alternatively estimates the number of bits required to represent a digital image or video at a particular quality in a compressed form.

SUMMARY OF THE INVENTION

Accordingly the present invention provides a bit rate control mechanism for video data compression that either estimates the number of bits required to represent a digital image or video at a particular quality in a compressed form or estimates the quality achievable for a digital image or video when compressed to a given number of bits. A quantizer for compressing the transform coefficients for a current block of samples of a video signal is controlled by a quality factor that is a function of a bit rate for a prior block of samples of the video signal as determined by a rate controller. In the rate controller a complexity parameter is determined as a function of the prior block of samples including the bit rate. The complexity parameter is then used together with the bit rate to generate the quality factor. The rate controller may also include a scene detector for resetting the rate controller at the beginning of each scene.

The objects, advantages and novel features of the present invention are apparent from the following detailed description when read in light of the appended claims and attached drawing.

BRIEF DESCRIPTION OF THE DRAWING

FIG. 1 is a block diagrammatic view of an adaptive still image coding technique with a bit rate controller according to the prior art.

FIG. 2 is a block diagrammatic view of a motion JPEG scheme with bit rate control according to the prior art.

FIG. 3 is a block diagrammatic view of an MPEG encoder with bit rate control according to the prior art.

DESCRIPTION OF THE PREFERRED EMBODIMENT

The relationship between the quality factor Q of a compressed video and the average bits R generated by a block, frame or field of samples is modeled through $$R = \alpha * Q^{-\beta}, Q > 0, \alpha \geq 0, \beta > 0$$

where $\alpha$ gives an indication of the complexity of the block being compressed, which may vary from block to block (frame/field to frame/field), and $\beta$, which empirically has significantly less variations, may be treated as a constant. This model is applicable to a number of image and video compression techniques, including JPEG, MPEG and MPEG-2. The quality factor Q may be used to generate the qfactor in JPEG or mquant in MPEG through simple scale and saturation operations.

If $\alpha$ and $\beta$ for block n equal $\alpha(n)$ and $\beta(n)$ respectively, the targeted bits $R(n)$ for block n may be achieved by using a quality factor $Q(n)$ given by $$Q(n) = (R(n)/\alpha(n))^{-1/\beta(n)}.$$

In general $\alpha(n)$ and $\beta(n)$ are not known in advance, but $\beta(n)$ may be assumed to be a constant $\beta$. Then the quality factor is given by $$Q(n) = (R(n)/\alpha(n))^{-1/\beta}.$$

Figure 4:
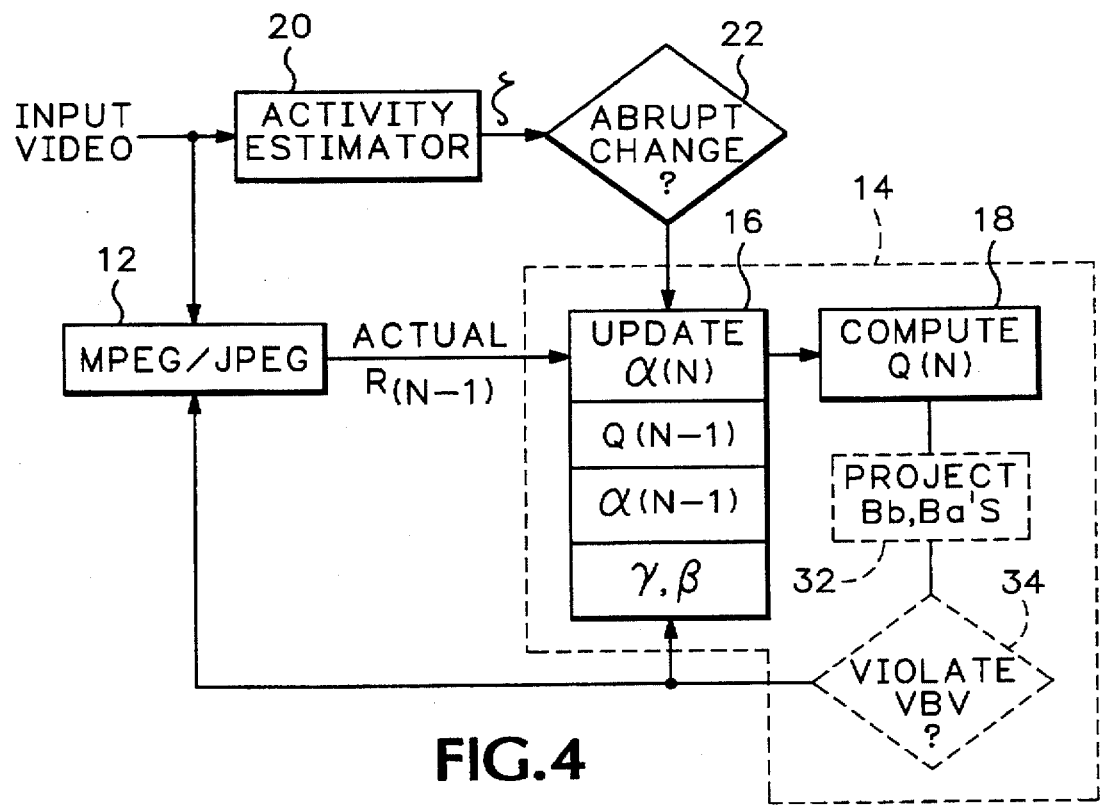
FIG. 4 is a block diagram view of a bit rate controller according to the present invention.

In motion JPEG and all MPEG coding schemes all the pictures in the video are compressed the same way, and only one complexity metric needs to be maintained. An input video signal is input to an MPEG or motion JPEG encoder 12 as shown in FIG. 4 to obtain an actual $R(n-1)$ for the prior frame. The actual $R(n-1)$ is input to a processor 14. The processor 14 has a complexity processor 16 which uses the previous history to estimate $\alpha(n)$:

$$\alpha(n) = (1-\gamma)*R(n-1)^{\beta} + \gamma*\alpha(n-1)$$

where $\gamma$ is the smoothing factor in the estimation of $\alpha$, $R(n-1)$ is the actual number of bits used for picture $n-1$. Depending upon the application, a value for $\gamma$ is selected from the range $0 \leq \gamma \leq 1$. If $\gamma=1$, $\alpha(n)$ is a constant with respect to n, and if $\gamma=0$, $\alpha(n)$ depends only on the preceding block coding results. Once $\alpha(n)$ is estimated, then it is input to a quality processor 18 where the quality factor $Q(n)$ may be computed as above. In MPEG the average rate R is used to obtain $Q(n)$, as well as the targeted $R(n)$ for a particular picture. $Q(n)$ is used to obtain results in actual $R(n)$, which is used for updating $\alpha(n)$. In motion JPEG, as well as in all-I MPEG, targeted $R(n)$ is the same for every picture, i.e., equal to the average required rate R. This R is used to obtain $Q(n)$, which is used to obtain actual $R(n)$ for updating $\alpha(n)$.

In a more general compression of video using MPEG the coded pictures may be categorized into three types: I, B and P. An Intra-coded (I) picture is coded using information only from itself. A Predictive-coded (P) picture is coded using motion compensated prediction from a past reference frame or past reference field. A Bidirectionally-coded (B) picture is coded using motion compensated prediction from a past and/or future reference frame(s). A given picture (field/frame) of video has a different coding complexity depending upon whether it is coded as an I, B or P picture. Therefore three picture complexity measures are used for the video, $\alpha_I$, $\alpha_B$ and $\alpha_P$ for I, B and P pictures respectively. Upon compressing the picture $n-1$ with a quality factor $Q(n-1)$, the actural output bits $R(n-1)$ are measured. Then depending upon the coded picture type $t(n-1)$ the corresponding picture complexity is updated:

$$\alpha_{t(n-1)}(n) = (1-\gamma)*R(n-1)*Q^{\beta}(n-1) + \gamma*\alpha_{t(n-1)}(n-1)$$

The other two picture complexities remain unchanged:

$$\alpha_s(n) = \alpha_s(n-1), s \in \{I, B, P\} \backslash t(n-1)$$

Then the target number of bits $R(n)$ and the quality factor $Q(n)$ for the current picture n may be computed through one of two methods: overlapping window method and non-overlapping window method. In both methods, as usually done in the MPEG world, the assumptions are:

$$Q_B = K_B * Q_I$$

$$Q_P = K_P * Q_I$$

where $K_B$ and $K_P$ are known constants, and $Q_I$, $Q_B$ and $Q_P$ are the quality factors used for I, B and P pictures respectively.

Figure 5:
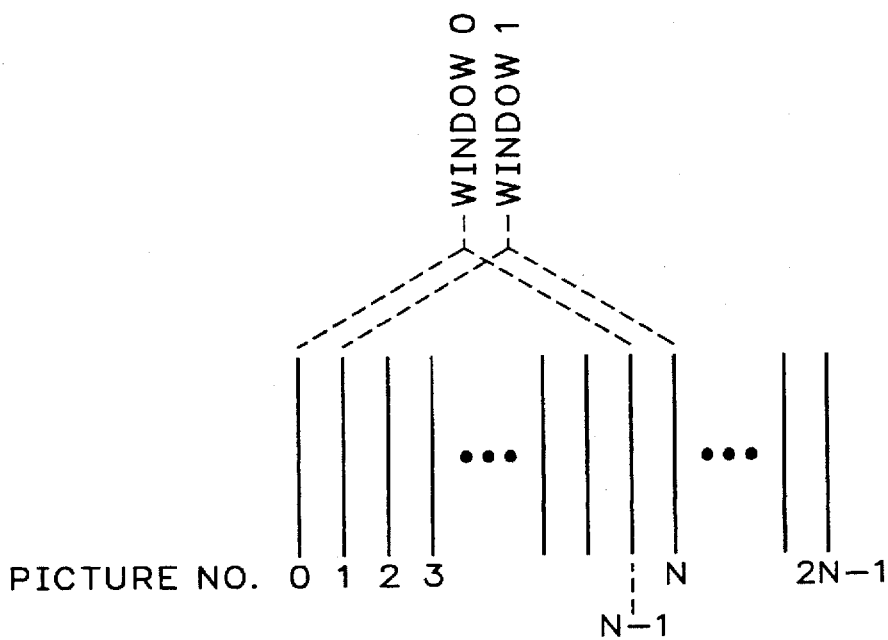
FIG. 5 is an illustrative view of picture grouping for an overlapping window method of determining quality and targeted number of bits according to the present invention.

In the overlapping window method, also known as the sliding window method, the stream of pictures (fields/frames) to be compressed, in coding order as opposed to the display order, are blocked into overlapping windows of size N as shown in FIG. 5. In this method pictures 0 through N−1 form the first window (WINDOW 0), pictures 1 through N form the second window (WINDOW 1), etc. After compressing each picture, the window is moved to the right by one picture. If $N_I$, $N_B$ and $N_P$ represent the number of I, B and P pictures remaining in the current window, then for the overlapping window method $$N_I + N_B + N_P = N$$
$$E(n) \triangleq \text{Targeted}R(n) - \text{Actual}R(n)$$

$$E(-1) = 0$$

$$Q_I(n) = ((\alpha_I N_I + \alpha_B N_B K_B^{-\beta_2})/((N_I + N_B + N_P)*R + E(n-1)))^{1/\beta}$$

where R is the average coding rate in bits per picture. From $Q_I$ values of $Q_B$ and $Q_P$ may be computed.

Finally the target rate R(n) for the picture n is computed through $$\text{Targeted}R(n) = \alpha_{t(n)} * Q_{t(n)}^{-\beta}(n)$$

where t(n) is the coding type of picture n.

In summary the overlapping window method has the following steps:
1. Initialize: E(−1) ← 0; select values for α's, β, γ and N; n ← 0
2. Before coding picture n
   (a) update $N_I$, $N_B$ and $N_P$
   (b) compute $Q_I$
   (c) compute $Q_B$ or $Q_P$ if needed
   (d) compute the target rate R(n)
3. After coding picture n with a quality factor $Q_{t(n)}$, measure the actual bits generated by picture n
4. Compute E(n) ← TargetedR(n) − ActualR(n)
5. Update α's
6. Move the window by one picture, increment n, and go to step 2

Figure 6:
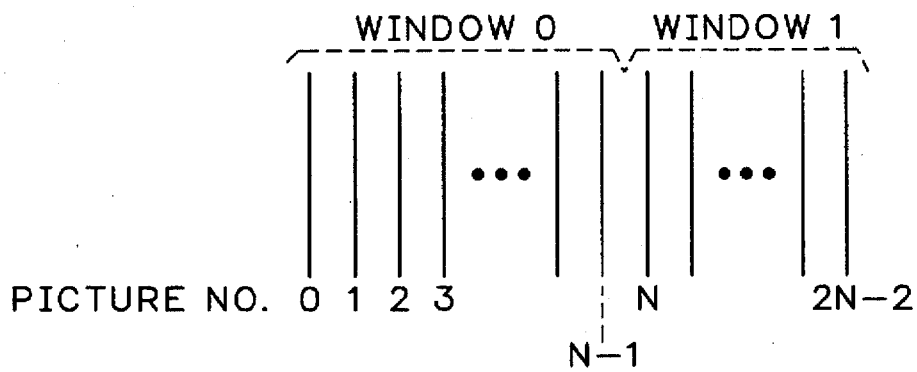
FIG. 6 is an illustrative view of picture grouping for a non-overlapping window method of determining quality and targeted number of bits according to the present invention.
Figure 7:
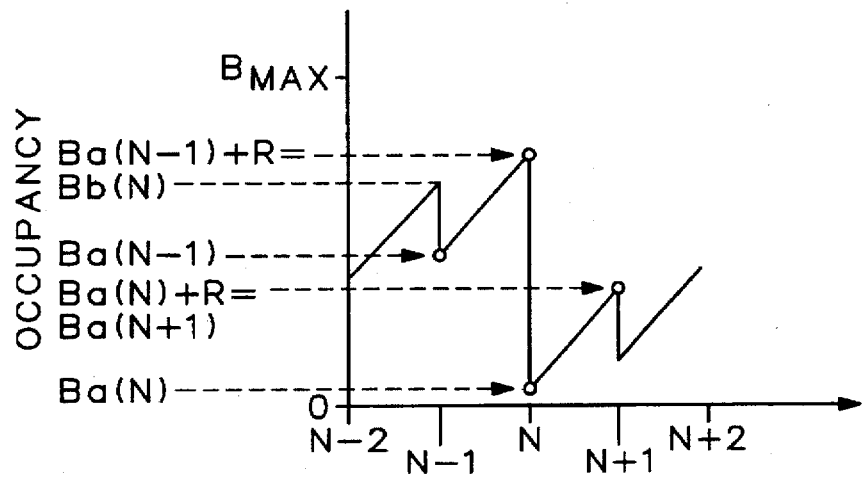
FIG. 7 is a graphic diagram view of buffer occupancy projection for constant bit-rate operation according to the present invention.

In the non-overlapping window method the stream of pictures to be compressed, in coding order rather than display order, is blocked into non-overlapping segments or windows of a preselected size N, as shown in FIG. 6. Each picture belongs to one and only one window. Then pictures 0 through N−1 form the first window, pictures N through 2N−1 form the second window, etc. If WinBits represents the bits available to the remaining pictures in the window and $N_I$, $N_B$ and $N_P$ represent the number of I, B and P pictures remaining in the current window, then for the non-overlapping windows method $$N_I + N_B + N_P \leq N$$

and Q(n) and R(n) are computed as follows:
1. Initialize: WinBits ← 0; select values for α's, β, γ and N; n ← 0
2. Beginning of window: WinBits ← WinBits + N*R
3. Before coding picture n
   (a) update $N_I$, $N_B$ and $N_P$
   (b) compute $Q_I(n) = ((\alpha_I N_I + \alpha_B N_B K_B^{-\beta})/\text{WinBits})^{-1/\beta}$
   (c) compute $Q_B$ or $Q_P$ if needed
   (d) compute the target rate R(n)
4. After coding picture n with a quality factor $Q_{t(n)}$, measure the actual bits generated by picture n
5. Update WinBits ← WinBits − ActualR(n)
6. Update α's In MPEG one of the requirements for generating a correctly coded bitstream is that the Video Buffer Verifier (VBV) is not violated. The VBV is a hypothetical decoder, described in ISO/IEC 13818-2 Annex C, which is conceptually connected to the output of an MPEG encoder. The VBV has an input buffer known as the VBV buffer of size $B_{max}$ bits. The target rate R(n) computed in step 2(d) above in the overlapping window method, or in step 3(d) in the non-overlapping window method, may have to be adjusted so as not to overflow or underflow the VBV buffer. The occupancy of the VBV buffer for a constant bit-rate operation of MPEG is shown in FIG. 7 in idealized form. The VBV buffer occupancy B is updated recursively as follows:

If Ba(n−1) is the buffer occupancy right after decoding picture (n−1),
the buffer occupancy just before decoding picture n, Bb{n}, is given by $$Bb(n) = Ba(n-1) + R$$

where R is the average bits per picture.

The occupancy Ba(n) just after decoding picture n is given by $$Ba(n) = Bb(n) - R(n)$$

where R(n) is the number of bits used for picture n. The relationship between the number of bits per picture, R(n), and the quality factor Q(n), described above may be used by an MPEG encoder to
1. maintain the constraints imposed by the VBV,
2. keep the VBV buffer occupancy operating point center, i.e., away from being nearly full or empty,
3. enable VBV buffer occupancy terminal conditions to be achieved, and
4. predict and avoid any potential VBV overflow and underflow condition.

To use this VBV based rate control strategy, the encoder keeps track of the following:
1. the current VBV buffer occupancy at picture n in coding order just before it is removed from the VBV buffer, i.e., Bb(n),
2. the number of pictures of each picture type (I, P and B) remaining in the current window,
3. the target VBV buffer occupancy at the end of a window, this occupancy being the VBV buffer occupancy just before the last picture within the window is removed from the VBV buffer, i.e., $Bb(n+N_I+N_P+N_B)$, and
4. the average number of bits per picture, R, assuming a constant bit rate coding.

The number of available bits to code all pictures remaining in the window, either overlapping or non-overlapping methods, is given by $$\text{WinBits} = Bb(n) + (N_I + N_P + N_B)*R - Bb(n+N_I+N_P+N_B).$$

Using the model described above the quality factor Q(n) for the remainder of the window is estimated by $$Q_I(n) = ((\alpha_I N_I + \alpha_P N_P K_P^{-\beta} + \alpha_B N_B K_B^{-\beta})/\text{WinBits})^{1/\beta}.$$

Then the target bits for each picture type within the window are given by:

$$\text{Target}R_I = \alpha_I Q_I^{-\beta},$$

$$\text{Target}R_P = \alpha_P K_P^{-\beta} Q_P^{-\beta}, \text{ and}$$

$$\text{Target}R_B = \alpha_B K_B^{-\beta} Q_B^{-\beta}.$$

Using these target sizes for each picture type, simulated VBV buffer occupancy trajectory over the window may be computed, i.e., Bb(n) and Ba(n)'s for all remaining pictures of the window are projected. If the trajectory indicates a VBV buffer overflow or underflow or comes close to causing the overflow or underflow, then the window is shortened such that it ends at the point where the overflow or underflow was indicated. A target VBV buffer occupancy is chosen such that no overflow or underflow occurs. With the shortened window $Q_I(n)$ and TargetR's are recomputed. This is shown in FIG. 4 where the quality factor Q(n) is input to a buffer occupancy predictor 3Z to project the Bb's and Ba's, which are then input to a VBV comparator 34.

When a satisfactory VBV buffer occupancy trajectory is obtained, then the current picture is coded. When the coding is completed, the actual size of the picture is then used to update the complexity estimates for the current picture type:

$$\alpha_{N(n-1)}(n)=(1-\gamma)*R(n-1)+\gamma*\alpha_{N(N=31\ 1)}(n-1).$$

For cases where there is no a priori target VBV buffer occupancy to terminate the window, the size of the window is chosen such that it ends on a "Group of Pictures" boundary. In this case $Bb(n+N_I+N_P+N_B)$ is chosen to be:

$$Bb(n+N_I N_P N_B)=0.5*(B_{max}+\text{Target}R_I).$$

Figure 8:
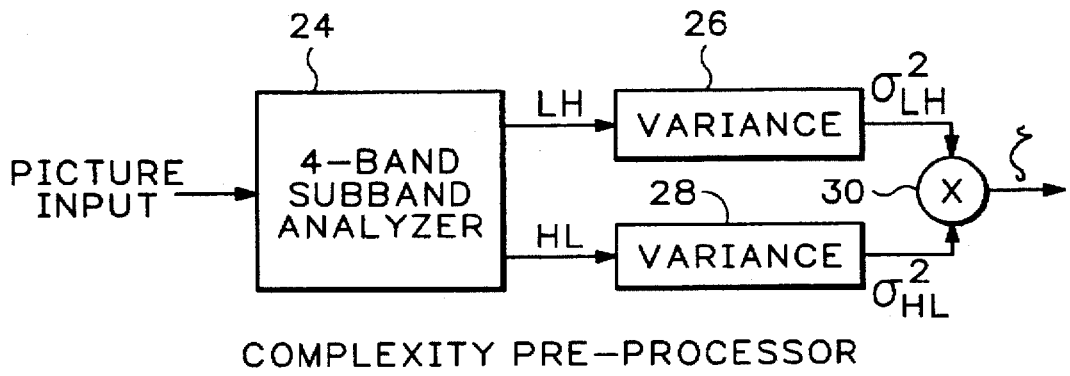
FIG. 8 is a block diagram view of a complexity preprocessor for determining scene cuts according to the present invention.

To compensate for the fact that the $\alpha$ parameter does not adapt in a relatively fast manner at scene changes in the input video, the input video as shown in FIG. 4 also is input to an activity estimator 20. The detected activity is input to comparator 22 to determine whether there has been an abrupt change corresponding to a scene change. The activity estimator 20, as shown in more detail in FIG. 8, measures the activity $\zeta$ of the picture to be coded in determining the complexity of the picture being compressed. A picture (field/frame) to be coded is broken into four bands by a subband analyzer 24. The variance of the energy in the low-high (LH) and high-low (HL) bands is determined by appropriate variance computational circuits 26, 28, and the two variances are input to a multiplier 30. The measure of activity $\zeta$ is calculated as the energy product in low-high and high-low bands:

$$\zeta=\sigma_{LH}^2*\sigma_{HL}^2$$

Any abrupt changes in $\zeta$ from picture to picture indicate a scene change in the video signal. When a scene cut or change is detected, the comparator 22 provides a signal to the processor 14 to flush the old value(s) of $\alpha(n)$ and $\gamma$ is temporarily made equal to 0, i.e., the system is reset. Other forms of scene cut detections are possible and may be used with the rate control mechanism of the present invention.

Thus the present invention provides a rate control mechanism for video compression that uses a special relationship model between the quality factor and the average bits generated using an indication of complexity of the block being processed.

What is claimed is:

1. A bit rate controller for a moving image data compression encoder comprising:

means in response to an actual bit rate for a prior coded block of the moving image data for generating a complexity factor as a function of a prior complexity factor and a prior quality factor for the prior coded block; and means for computing a quality factor for a present block of the moving image data compression decoder as a function of the complexity factor and a target bit rate for the present block.

2. The bit rate controller as recited in claim 1 further comprising:

means for projecting a virtual buffer occupancy as a function of the quality factor; and means for controlling a width of a processing window for the generating means so that the virtual buffer occupancy does not overflow or underflow.

3. The bit rate controller as recited in claims I or 2 further comprising:

means for estimating an activity factor between images of the moving image data; and means for indicating a scene change to initialize the generating means when the activity factor indicates an abrupt change between images.

4. A method of bit rate control for digital image and video compression of the type wherein a quality factor for controlling a quantizer for a current block of samples of a video signal is generated by a rate controller as a function of a bit rate for a prior block of samples of the video signal comprising the steps of:

estimating a complexity parameter for the current block of samples as a function of a prior block of samples including the bit rate; and determining from the complexity parameter the quality factor for output from the rate controller.

5. The method as recited in claim 4 further comprising the steps off detecting a scene change in the video signal; and resetting the rate controller prior to the estimating step when the scene change is detected by the detecting step.

6. The method as recited in claims 4 or 5 further comprising the steps of:

projecting a virtual buffer occupancy as a function of a prior occupancy and an average bit rate; and controlling a processing window for the estimating step so that the virtual buffer occupancy does not overflow or underflow.

7. A method of compressing moving image data comprising the steps initializing a bit rate controller by selecting a complexity of value and a size for a processing window in terms of a given number of pictures of the moving image data;

determining by the bit rate controller a quality factor for a block of the moving image data as a function of the complexity value, the size of the processing window, an average bit rate and a bit error rate;

computing a target bit rate for the block of the moving image data as a function of the quality factor and the complexity value;

coding the block of the moving image data in an encoder using the quality factor;

updating the bit error rate as a function of an actual bit rate from the encoder for the block of the moving image data and the target bit rate, and updating the complexity value for a next block of the moving image data as a function of the quality factor and complexity value for the block of the moving image data;

moving the processing window by one block of the moving image data; and repeating the determining, computing, coding, updating and moving steps for the next block of the moving image data.

8. A method of compressing moving image data comprising the steps of:

initializing a bit rate controller by selecting a complexity value and a size for a processing window in terms of a given number of pictures of the moving image data;

determining a number of bits for the window as a function of the size of the processing window and an average bit rate;

computing by the bit rate controller a quality factor for a block of the moving image data as a function of the complexity value, a remaining size of the processing window and the number of bits for the processing window, and computing a target bit rate for the block of the moving image data as a function of the quality factor and the complexity value;

coding the block of the moving image data in an encoder using the quality factor;

updating the number of bits in the processing window as a function of an actual bit rate from the encoder for the block of the moving image data, the size of the processing window to determine the remaining size, and the complexity value for a next block of the moving image data within the processing window as a function of the quality factor and complexity value for the block of the moving image data;

repeating the determining, computing, coding and updating steps for each block within the processing window; and moving the processing window by the size of the processing window and repeating the above steps for a next group of blocks of the moving image data.

* * * * *